United States Patent [19]

Block

[11] Patent Number: 4,952,536
[45] Date of Patent: Aug. 28, 1990

[54] HIGH STRENGTH $Al_2O_3$

[75] Inventor: Jacob Block, Rockville, Md.

[73] Assignee: W. R. Grace & Co.-Conn., New York, N.Y.

[21] Appl. No.: 314,001

[22] Filed: Feb. 23, 1989

[51] Int. Cl.$^5$ ............................................. C04B 35/10
[52] U.S. Cl. ...................................... 501/127; 501/12; 501/105; 501/153; 264/63
[58] Field of Search ................. 501/12, 105, 127, 153; 264/63

[56] References Cited

U.S. PATENT DOCUMENTS

| | | | |
|---|---|---|---|
| 4,028,453 | 6/1977 | Miller et al. | 501/127 |
| 4,218,253 | 8/1980 | Dworak et al. | |
| 4,316,964 | 2/1982 | Lange . | |
| 4,419,311 | 12/1983 | Calussen et al. | |
| 4,429,051 | 1/1984 | Davidge et al. | 501/12 |
| 4,784,812 | 11/1988 | Saitoh et al. | 264/63 |

OTHER PUBLICATIONS

*Introduction to Ceramics*, Kingery ©1960, Chap. 33, pp. 47–49.
"Influence with Small $ZrO_2$ Additions on the Microstructure and Mechanical Properties of $Al_2O_3$", Advances in Ceramics, vol. 24A: Science and Technology of Zirconia III, 1988, p. 423, (published by American Ceramic Society).
"Transient Thermal Stress Behavior in $ZrO_2$-Toughened $Al_2O_3$", Journal of the American Ceramic Society, 64, No. 1, Jan. 1981, pp. 37–39.

*Primary Examiner*—Mark L. Bell
*Assistant Examiner*—Deborah Jones
*Attorney, Agent, or Firm*—Edward J. Cabic

[57] ABSTRACT

An extruded and sintered $Al_2O_3$ body having high flexural strength is produced by extruding and sintering and extrusion mixture of alpha-$Al_2O_3$ powder, an organic dispersing agent, an optional deaeration agent, and a zirconia sol. The zirconia sol is present in a small amount such that upon firing the final $ZrO_2$ content of the final body is less than 1 weight percent. The sintered alumina body has a uniform distribution of $ZrO_2$ particles in the size range of 0.1–1.0 microns.

16 Claims, No Drawings

HIGH STRENGTH $Al_2O_3$

BACKGROUND OF THE INVENTION

1. Field of Invention

This invention relates to a method to produce extruded alumina ($Al_2O_3$) bodies containing at least 99 weight % (w/o) $Al_2O_3$ with less than 1 w/o $ZrO_2$ having high flexural strength.

2. Description of the Previously Published Art

Zirconia has been added to alumina to improve its properties.

In U.S. Pat. No. 4,316,964 $ZrO_2$ was added in an amount from 5 to 95% of the volume of the alumina ceramic to increase the fracture toughness and strength of the $Al_2O_3/ZrO_2$ ceramic. The zirconia had dissolved in it a rare earth oxide such as $Y_2O_3$, $CeO_2$, $La_2O_3$ and/or $Er_2O_3$ to promote retention of the metastable tetragonal $ZrO_2$. The 5 volume % zirconia in the above composition corresponds to 7.3% on a weight basis.

U.S. Pat. No. 4,419,311 discloses the production of high-strength ceramic bodies of alumina with unstabilized zirconia for the formation of controlled microfissures. An unstabilized zirconia dioxide and/or hafnium dioxide with a particle size of 0.3 to 1.25 microns was added as a ceramic embedment material to generate tensile stresses for the formation of controlled microfissures. The amount of the ceramic embedment was from 4 to 25% of the volume of the body to be formed. In this composition, 4 volume % corresponds to 5.9 weight %.

U.S. Pat. No. 4,218,253 discloses improving the ductility of sintered alumina bodies by uniformly distributing individual particles of tetragonal zirconia or hafnia in amounts of 1%–50% by volume. The dispersed particles are to have an average size of 0.05 to 2 microns. In this composition 1 volume % $ZrO_2$ is equal to 1.5 weight % $ZrO_2$. In this reference, and in the above described reference, there is no mention of extruded articles. Only articles prepared by pressing techniques are disclosed.

S. Hori et al in their article "Influence with Small $ZrO_2$ Additions on the Microstructure and Mechanical Properties of $Al_2O_3$" in *Advances in Ceramics*, Vol. 24A: Science and Technology of Zirconia III, 1988 p. 423 (published by American Ceramic Society) disclose that the addition of $ZrO_2$ in an amount of up to 1 wt % increased the strength but decreased the toughness of $Al_2O_3$ due to the strong dependence of these properties on the $Al_2O_3$ grain size. The articles produced have a three point flexural strength of 58,000 psi at 1 w/o $ZrO_2$ levels. This value is substantially below our average value of 73,000 psi (obtained without organic binders). Furthermore, the products of this reference were prepared by isostatically pressing mixtures of alumina and alumina/zirconia powders, whereas we are mixing alumina powder with a zirconia sol, thereby introducing the zirconia at a much finer particle size (5–10 nanometers). The zirconia, with particles this small, permit more intimate mixing of the zirconia with the alumina.

P. F. Becher in "Transient Thermal Stress Behavior in $ZrO_2$-Toughened $Al_2O_3$" in the Journal of the American Ceramic Society, 64, No. 1, January 1981, pp. 37–39, discloses characteristics of hot-pressed $Al_2O_3$-$ZrO_2$ composites. The article discusses how the resistance of ceramics to transient thermal stresses can be improved by modifying the thermal-mechanical properties of the matrix. The articles produced have 61,000 psi (3 point flexural strength) at 0.75 w/o $ZrO_2$ levels. These strengths are again lower than our values (without binder). The composites were prepared by mixing $Al_2O_3$ and $ZrO_2$ obtained from mixtures of gelled alkoxide derived sols. The powders were vacuum hot pressed in order to obtain dense products. This procedure is typical for gel derived powders, which are typically difficult to densify. Our extruded product, densifies very readily.

3. Objects of the Invention

It is an object of this invention to extrude $Al_2O_3$ bodies containing at least 99 w/o $Al_2O_3$ and less than 1 w/o $ZrO_2$ having high flexural strength.

It is a further object of this invention to form extruded $Al_2O_3$ bodies by combining an organic dispersing agent and a zirconia sol to produce high-strength bodies.

It is a further object of this invention to form extruded $Al_2O_3$ bodies by combining an organic dispersing agent, a zirconia sol and an organic deaerating agent to produce high-strength bodies.

It is a further object of this invention to combine an organic dispersing agent, a zirconia sol and an organic binder with $Al_2O_3$ to produce large size, high-strength bodies.

It is a further object of this invention to form extruded $Al_2O_3$ having less than 1 w/o $ZrO_2$ bodies having no organic binder and having 3 point flexural strengths greater than 65,000 psi.

It is a further object of this invention to form extruded $Al_2O_3$ bodies having less than 1 w/o $ZrO_2$ using organic binders with 3 point flexural strengths greater than 55,000 psi.

These and further objects will become apparent as the description of the invention proceeds.

SUMMARY OF THE INVENTION

Alumina extruded bodies containing at least 99 w/o $Al_2O_3$ can be formed with high flexural strength by combining with the $Al_2O_3$ prior to extrusion an organic dispersing agent, a zirconia sol and an optional deaerating agent. When making small size objects no organic binder is needed. However, in a preferred embodiment for making larger size objects, small amounts of a further organic binder can be added. The mixture is extruded and upon firing the organic materials are burned off leaving a final body having less than 1 w/o $ZrO_2$ These products have flexural strengths of greater than 65,000 psi or when using organic binders the flexural strengths can be greater than 55,000 psi. They are suitable for use as wear tiles, grinding media, etc.

DESCRIPTION OF THE PREFERRED EMBODIMENTS

Alpha-$Al_2O_3$ powder is mixed with an ammonium salt of a low molecular weight polyacrylic acid such as Darvan 821A, sold by R. T. Vanderbilt Co., followed by the addition of a zirconia sol. The sol is preferably a commercial product obtained from Nyacol Products, Inc. an affiliate of the PQ Corporation. The $ZrO_2$ particle size in the sol is 5–10 nanometers. The resulting mix is then extruded to form an alumina body. A small amount of n-octanol can be added prior to extrusion to remove residual entrapped air. The extrusions fired in a furnace at about 1650° C. to produce dense $Al_2O_3$ bodies. The $Al_2O_3$ content of the fired body is greater than 99 w/o. Flexural strengths (3-point) average 73,000 psi and can range as high as 90,000 psi.

It is believed that the Darvan 821A first acts as a dispersant for alpha-Al$_2$O$_3$, breaking up agglomerates, and then causes gelation of the sol. The gelled sol provides good rheological properties for extrusion. The n-octanol removes trapped air pockets and bubbles. The ZrO$_2$ also functions as a grain growth inhibitor for alpha-Al$_2$O$_3$, which also leads to higher strengths.

Typical dispersing agents for this invention are the ammonium salts of polyacrylic or polymethacrylic acids. Darvan C and Darvan 821A, sold by R. T. Vanderbilt, Co., Inc. are typical examples. Darvan 821A is preferred.

The flexural strength tests were performed on an Instron Model TM Dynamic Materials Tester. The tests were 3-point, using a ½ inch span at cross-head speed of 0.02 to 0.1 inch/min.

If large extruded pieces are desired, a small amount, such as 0.5-2.0 w/o on an alumina basis, of an organic binder can be added to provide green strength. Typical binders are any of the methylcellulose derivatives such as Methocels sold by Dow Chemical, hydroxypropylcelluloses, polyvinyl alcohols, etc. Methocels are preferred.

The ZrO$_2$ sol can either be prepared in the laboratory by peptization, ion exchange, solvent extraction, etc. or obtained commercially. The ZrO$_2$ sol marketed by Nyacol is preferred. The amount of ZrO$_2$ in the final product is preferably less than 1.0 w/o on an alumina basis and more preferably it is present in an amount to give a final ZrO$_2$ concentration of 0.25 to 1.0 w/o on an alumina basis.

The extruded bodies are then air dried or oven dried to remove residual excess water. The dried bodies are then heated to about 500°-600° C. to burn off any organics. The bodies are then heated to 1500°-1650° C. to sinter and densify. Heating rates can vary, and are not critical.

N-octanol has been found to be an effective deaeration agent. It is believed to act by forming a surface film which breaks up air bubbles. Generally it is used in an amount of 0.1-0.5 w/o on an alumina basis. Other defoaming agents can also be used. N-octanol is preferred.

Having described the basic aspects of our invention, the following examples are given to illustrate specific embodiments thereof.

EXAMPLE 1

This example illustrates the unexpected high strengths obtained by using the components of this invention.

To 100 parts by weight of alpha-alumina (Alcoa A-16 SG) was added 1.25 parts Darvan 821A (an ammonium polyelectrolyte dispersion agent from R. T. Vanderbilt Co., Inc., Norwalk, CT), 27.5 parts of a diluted zirconia sol (1 part ZrO$_2$ sol, acetate based, 20% ZrO$_2$, obtained from Nyacol Products, Inc., Ashland, MA, per 4.8 parts of H$_2$O) and 0.3 part of n-octanol. The ingredients were mixed together and then extruded into rods 2 mm in diameter by approximately 150 mm in length. The extrusions were air dried and then heated in a furnace at 10° C./min to 600° C. and held at this temperature for 1 hour to remove organics. After the 1-hour hold, the material was then heated to 1650° C. at 17.5° C./min, with a 2-hour hold at 1650° C. to sinter and densify. Flexural strengths (3 point) were obtained and the average of 6 values was 73,100 psi. The average of the four highest values was 82,900 psi. These values are significantly higher than what has been reported in the literature such as the Hori et al and Becher references cited supra where there are values of 58,000 and 61,000 psi, respectively.

EXAMPLE 2

This example shows that substitution of the ZrO$_2$ sol by a conventional organic binder results in lower strengths.

The experiment of Example 1 was repeated with the exception that a 1% solution of polyvinyl alcohol was substituted for the diluted ZrO$_2$ sol. The average strength obtained (6 values) was 37,000 psi.

EXAMPLE 3

This example shows the effect of omitting the n-octanol deaeration agent.

The experiment of Example 1 was repeated, with the exception that the n-octanol was omitted. The average flexural strength obtained was 52,600 psi (5 values).

EXAMPLE 4

This example shows the effect of omitting the Darvan 821A dispersion agent.

The experiment of Example 1 was repeated, with the exception that the Darvan 821A was omitted. The average flexural strength obtained was 52,300 pse (6 values).

EXAMPLE 5

This example shows the effect of reduced ZrO$_2$ levels.

The experiment of Example 1 was repeated, with the exception that a 1.725 w/o ZrO$_2$ sol was used instead of a 3.45 w/o ZrO$_2$ sol, thus reducing the ZrO$_2$ level from 0.95 w/o to 0.475 w/o on an alumina basis. The average flexural strength obtained was 56,800 psi (4 values).

EXAMPLE 6

This example shows the effect of the addition of an organic binder used to provide green strength for large size bodies.

Alcan AM-2 alumina (4000 g) was mixed with 50 g Darvan 821A dispersant and 800 g 2-propanol. 2-propanol was substituted for water, because it resulted in a more fluffy powder. Water could also be used. The mixture was dried overnight at 75° C. The dried powder was then mixed in a sigma blade mixer with 40 g Methocel 20-213 and 190 g ZrO$_2$ sol (Nyacol—20% ZrO$_2$) and 685 g deionized H$_2$O. The resulting paste was extruded into bars using a Loomis ram extruder. The bars were fired at 10° C./min to 600° C., held for 1 hour and then fired at 17.5° C. per min. to 1610° C. and held for 2 hours followed by cooling to room temperature. The average flexural strength for these bars was 56,000 psi, compared to 44,000 psi for similar bars prepared without the ZrO$_2$ sol.

It is understood that the foregoing detailed description is given merely by way of illustration and that many variations may be made therein without departing from the spirit of this invention.

What is claimed is:

1. A method of producing an extruded Al$_2$O$_3$ body having a high flexural strength comprising the steps of:
   (a) forming an extrusion mixture of alpha-Al$_2$O$_3$ powder, an organic dispersing agent, up to 2.0wt % of an organic binder, and a zirconia sol, the amount of said sol being such that upon firing, the ZrO$_2$ is present is the final body in an amount of no more than 1 w/o;

(b) extruding the mixture of step (a) to form an extruded body;
(c) sintering the extruded body to form a final $Al_2O_3$ body containing no more than 1 w/o $ZrO_2$ having high flexural strength and having a 3 point flexural strength greater than 55,000 psi.

2. A method according to claim 1, wherein the extrusion mixture of step (a) further contains a deaeration agent.

3. A method according to claim 1, wherein the organic binder is present in an amount of about 0.5 to 2.0 weight %.

4. A method according to claim 2, wherein the zirconia sol has particles in the size range of about 5-10 nanometers.

5. A method according to claim 2, wherein the organic dispersing agent in step (a) is present in an amount of 1 to 2 weight % on an alumina basis.

6. A method according to claim 2, wherein the zirconia sol in step (a) is present in an amount sufficient to give a final $ZrO_2$ concentration of 0.25 to 1.0 w/o on an alumina basis.

7. A method according to claim 2, wherein the deaeration agent in step (a) is present in an amount of 0.1-0.5 w/o on an alumina basis.

8. A method according to claim 7, wherein the deaeration agent is n-octanol.

9. A method according to claim 2, wherein the extruded sintered body has a 3 point flexural strength greater than 65,000 psi.

10. A method according to claim 9, wherein the extruded sintered body has a 3 point flexural strength greater than 73,000 psi.

11. An alumina body, having a uniform distribution of $ZrO_2$ particles in the size range of 0.1-1.0 microns and present in an amount equal to no more than 1.0 w/o $ZrO_2$.

12. An extruded and sintered $Al_2O_3$ body having present less than 1 w/o $ZrO_2$ uniformly distributed as particles of a size of 0.1-1 micron and having a 3 point flexural strength of at least 55,000 psi.

13. An extruded and sintered $Al_2O_3$ body according to claim 12, having a 3 point flexural strength of at least 65,000 psi.

14. An extruded and sintered $Al_2O_3$ body having high flexural strength made by the process of
(a) forming an extrusion mixture of alpha-$Al_2O_3$ powder, an organic dispersing agent, a deaeration agent, and a zirconia sol, the amount of said sol being such that upon firing, the $ZrO_2$ is present in the final body in an amount of no more than 1 w/o;
(b) extruding the mixture of step (a) to form an extruded body; and
(c) sintering the extruded body to form a final $Al_2O_3$ body containing no more than 1 w/o $ZrO_2$ having high flexural strength and having a 3 point flexural strength of at least 55,000 psi,
said body having less than 1.0 w/o $ZrO_2$ where the zirconia is sol derived.

15. An extruded and sintered $Al_2O_3$ body according to claim 14, wherein the extruded body has a 3 point flexural strength greater than 65,000 psi.

16. An extruded and sintered $Al_2O_3$ body according to claim 14, wherein the extrusion mixture of step (a) further contains an organic binder.

* * * * *